US011982122B2

(12) United States Patent
Condon et al.

(10) Patent No.: US 11,982,122 B2
(45) Date of Patent: May 14, 2024

(54) GLASS WALL FIN SYSTEM

(71) Applicant: WEST TAMPA GLASS COMPANY, Tampa, FL (US)

(72) Inventors: Patrick Condon, Oldsmar, FL (US); Joshua A. Martin, New Port Richey, FL (US); Jonathon Carroll, Brooksville, FL (US)

(73) Assignee: West Tampa Glass Company, Tampa, FL (US)

( * ) Notice: Subject to any disclaimer, the term of this patent is extended or adjusted under 35 U.S.C. 154(b) by 82 days.

(21) Appl. No.: 17/877,890

(22) Filed: Jul. 30, 2022

(65) Prior Publication Data

US 2023/0038884 A1 Feb. 9, 2023

Related U.S. Application Data

(60) Provisional application No. 63/230,939, filed on Aug. 9, 2021.

(51) Int. Cl.
*E06B 5/12* (2006.01)
*E04B 2/96* (2006.01)

(52) U.S. Cl.
CPC . *E06B 5/12* (2013.01); *E04B 2/96* (2013.01)

(58) Field of Classification Search
CPC . E06B 5/12; E06B 3/5427; E06B 1/38; E04B 2/96
See application file for complete search history.

(56) References Cited

U.S. PATENT DOCUMENTS

| | | | | |
|---|---|---|---|---|
| 4,611,447 | A | 9/1986 | Krechel | |
| 4,660,903 | A * | 4/1987 | Shinagawa | E06B 3/6621 312/31 |
| 4,866,896 | A | 9/1989 | Shreiner | |
| 6,035,598 | A | 3/2000 | Sukolics | |
| 6,202,377 | B1 | 3/2001 | Krieger | |
| 6,688,064 | B1 * | 2/2004 | Swanick | E06B 3/728 52/800.14 |
| 6,988,344 | B1 | 1/2006 | Krueger | |
| 7,562,509 | B2 | 7/2009 | Ness | |
| 7,937,902 | B1 | 5/2011 | Smith | |
| 2008/0134594 | A1 | 6/2008 | Ness | |
| 2009/0241451 | A1 | 10/2009 | Griffiths | |
| 2009/0313932 | A1 | 12/2009 | Montgomery | |
| 2010/0229484 | A1 | 9/2010 | Carolan | |
| 2010/0251647 | A1 | 10/2010 | Enns | |
| 2010/0264690 | A1 | 10/2010 | Brown | |
| 2012/0085042 | A1 | 4/2012 | Macdonald et al. | |
| 2013/0205698 | A1 | 8/2013 | Todd | |

* cited by examiner

*Primary Examiner* — Patrick J Maestri
(74) *Attorney, Agent, or Firm* — Larson & Larson; Frank Liebenow; Justin P. Miller

(57) ABSTRACT

A window system is disclosed. The window system provides improved visibility while protecting against wind and flying debris. In some embodiments, the window panel is made using insulated safety glass for added insulation from the elements and impact protection for wind borne debris. Fins (e.g., glass fins) are affixed to a vertical edge of each window panel to provide extra resistance to wind and flying debris while providing improved visibility over window systems that have metal frames. In some embodiments, the glass fins are made from laminated glass to achieve thicknesses of between two and three inches. In some embodiments, especially when the window panel is very tall, one or more horizontal fins are affixed to the inside surface of the glass for added strength.

19 Claims, 12 Drawing Sheets

GLASS WALL FIN SYSTEM

CROSS-REFERENCE TO RELATED APPLICATION

This application is a non-provisional application taking priority from U.S. patent application Ser. No. 63/230,939, filed Aug. 9, 2021, the disclosure of which is hereby incorporated by reference.

FIELD

This invention relates to the field of glass panels and more particularly to a system for a glass curtain having beauty and hurricane resistance.

BACKGROUND

Glass curtains are used in countless buildings to provide light, visibility to the outside, insulation from heat and cold, and architectural beauty. For example, many high-end hotels have lobbies that have a complete wall or several walls that are made up of glass panels, allowing ample light and providing architectural beauty to the location that hotel guests see first.

Such glass walls add to the architectural beauty of a building, but in light of environmental needs, there needs to be proper insulation and tinting to limit energy consumption.

Further, detracting from the overall architectural beauty is a grid system of supports that surround each panel of the glass wall, interrupting the view and detracting from the architectural beauty. Such a grid system was often needed to provide structural support to the individual glass panels so that during high winds or other forces, the glass panels don't pop out and when objects are thrown against the glass panels, the glass panels don't fail other than cracking or spidering.

In recent years, glass wall makers have attempted to overcome the unappealing look of the grid system. One method of eliminating the grid system is to use what is known as a spider mount, in which a bracket that resembles a 4-legged spider attaches external glass lites to an internal fin, using through-bolts at the four corners of 4 adjacent glass panels. Some spiders are then supported by a taunt cable system running both horizontally and vertically, holding the glass panels in place. Such a system improves aesthetics by replacing the metal grid frame system with the spiders and cables, but the spiders and cables are very visible and the cost of producing and installing such a system is very expensive as holes must be formed in the corner of each glass panel, spiders attached with fasteners in the field and cables run, anchored, and tightened in the field. Further, such systems have been applied to laminated glass panels with reasonable success, but rarely to insulated glass panels (e.g., two sheets of glass separated and filled with air or another gas), as it would be difficult to pass the mounting bolts of the spider system through insulated glass panels as leaks would easily occur. Such leaks will reduce the insulative properties of the panels and leading to fogging, thereby reducing the beauty of the glass wall.

Many buildings need or require certain resistance to flying debris, especially in areas that are prone to windstorms such as coastal areas and inland areas that frequently experience tornadoes or straight-line winds. Many areas have building codes that specify how much the window systems must withstand and such window systems are tested to meet the requirements by hurling a 2×4 stud at the window from various angles, hitting the window in various locations. Note that such requirements and codes allow for the window to be damaged (e.g., it is anticipated that on impact, the flying object will cause some of the window glass to break or spider, but the goal is to prevent penetration by wind and rain.

What is needed is a window system that will provide a relatively unobstructed view through a glass curtain wall while maintaining the required structural strength, ability to install, and thermal insulative properties required by architects and local ordinances.

SUMMARY

Embodiments of a window system provide improved visibility while protecting against flying debris and, in some embodiments, providing insulated safety glass for added insulation from the elements.

In one embodiment, a window panel is disclosed including a rectangular sheet that comprises glass (e.g., solid glass or safety glass). The rectangular sheet has a front planar surface, a back planar surface, two horizontal sides, and two vertical sides. A vertical fin is affixed to the back planar surface of the rectangular sheet at a vertical edge of the rectangular sheet. The vertical fin is made from sheets of the glass laminated together.

In another embodiment, glass curtain is disclosed including a plurality of window panels. Each window panel has a rectangular sheet made with glass. The rectangular sheet has a front planar surface, a back planar surface, two horizontal sides, and two vertical sides. There is a vertical fin affixed to the back planar surface of the rectangular sheet at a vertical edge of the rectangular sheet. The vertical fin is made from sheets of the glass laminated together. A first vertical side of a first window panel is affixed to an opposite vertical side of an adjacent window panel by the vertical fin of the first window panel.

In another embodiment, glass curtain is disclosed including a plurality of window panels. Each window panel has a rectangular sheet made with glass. The rectangular sheet has a front planar surface, a back planar surface, two horizontal sides, and two vertical sides. A vertical fin is affixed to the back planar surface of the rectangular sheet at a vertical edge of the rectangular sheet and a horizontal fin is affixed to the back planar surface of the rectangular sheet at one of the horizontal edges. The vertical and horizontal fins are made from sheets of the glass laminated together. A first vertical side of a first window panel of the plurality of window panels is affixed to an opposite vertical side of an adjacent window panel of the plurality of window panels by the vertical fin of the first window panel and the first window panel of the plurality of window panels is also affixed to an opposite horizontal side of a third window panel of the plurality of window panels by the horizontal fin of the first window panel, the horizontal fin affixed to the back planar surface of the third panel at a horizontal edge of the rectangular sheet of the third panel.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
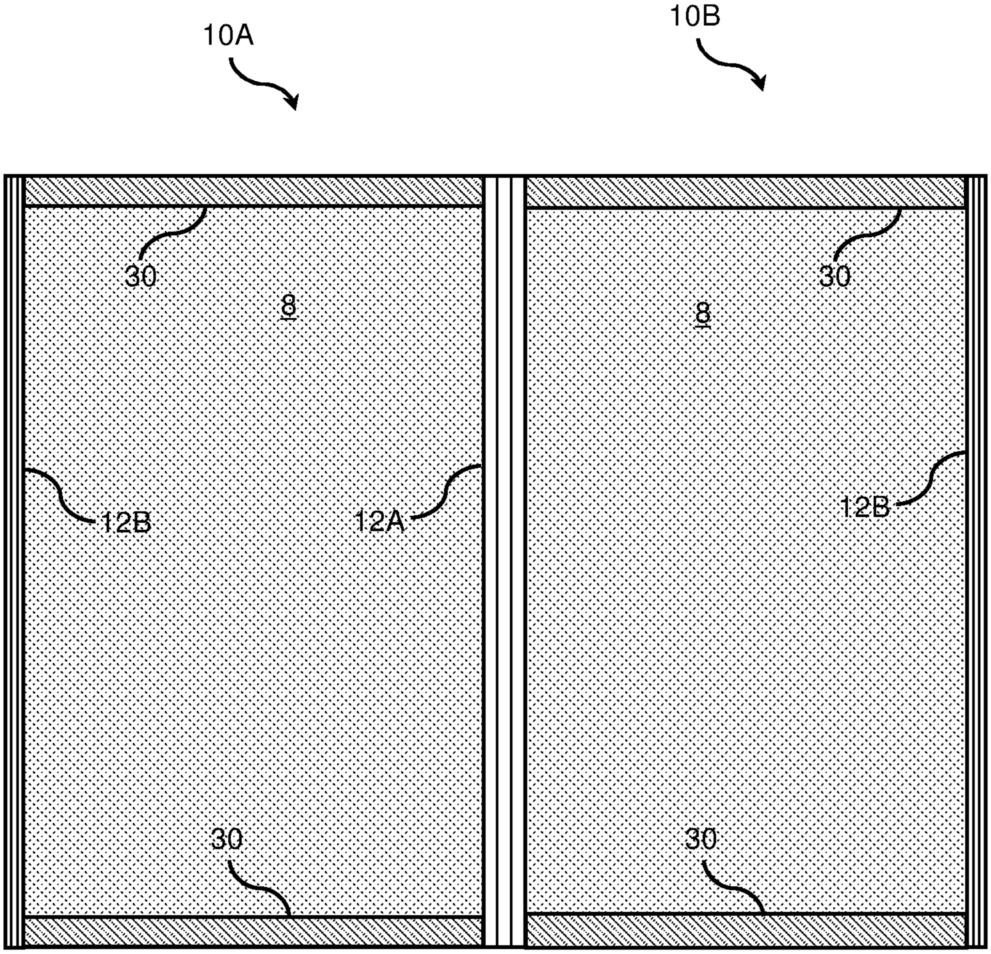
FIG. 1 illustrates a front view of a window system.

Reference will now be made in detail to the presently preferred embodiments of the invention, examples of which are illustrated in the accompanying drawings. Throughout the following detailed description, the same reference numerals refer to the same elements in all figures.

Figure 2:
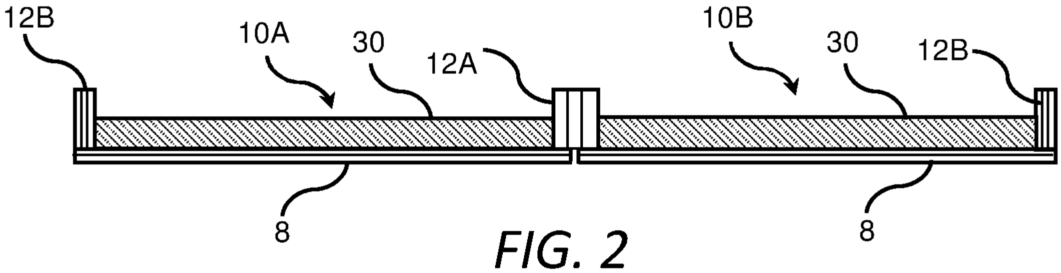
FIG. 2 illustrates a bottom view of the window system.
Figure 1A:
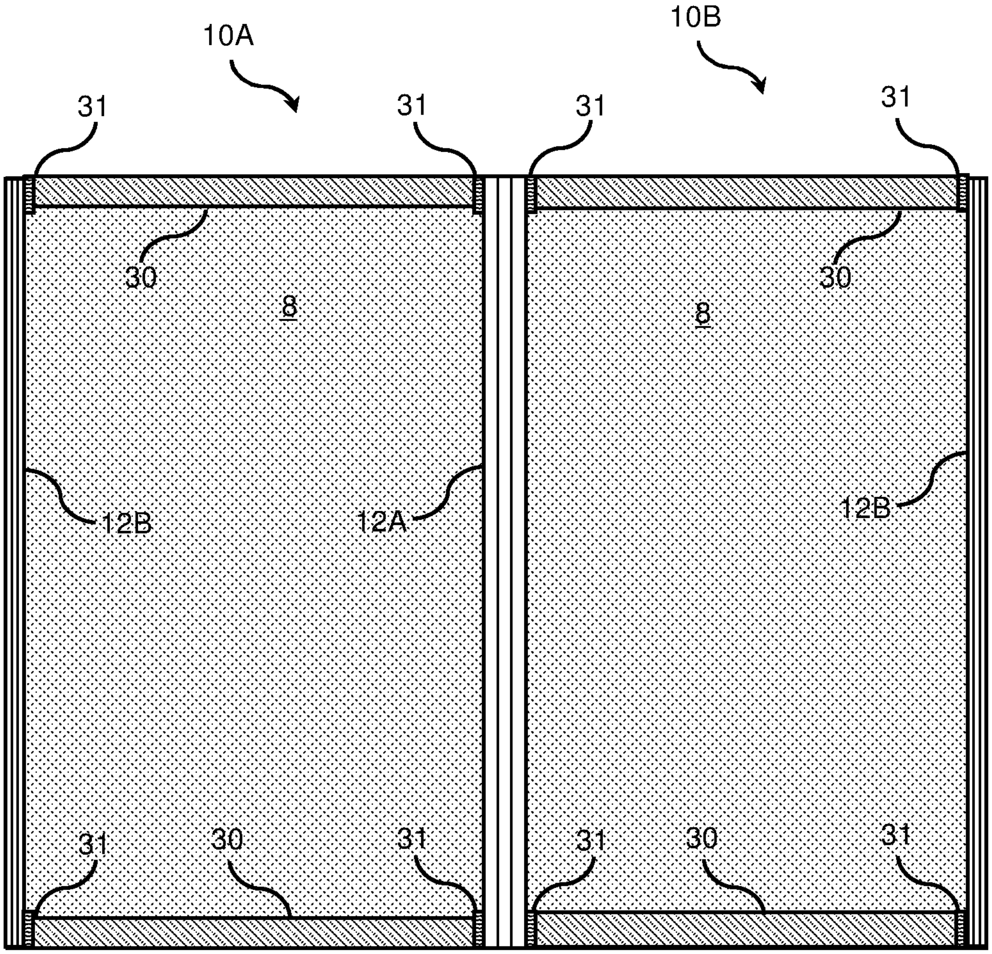
FIG. 1A illustrates a front view of a window system with metal support.
Figure 2A:
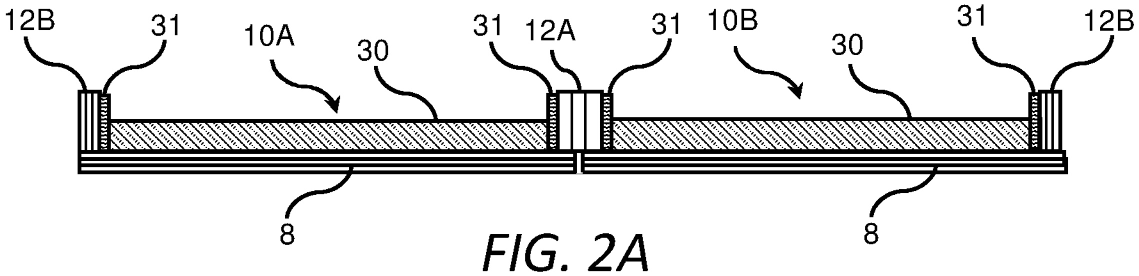
FIG. 2A illustrates a bottom view of the window system with metal support.
Figure 3:
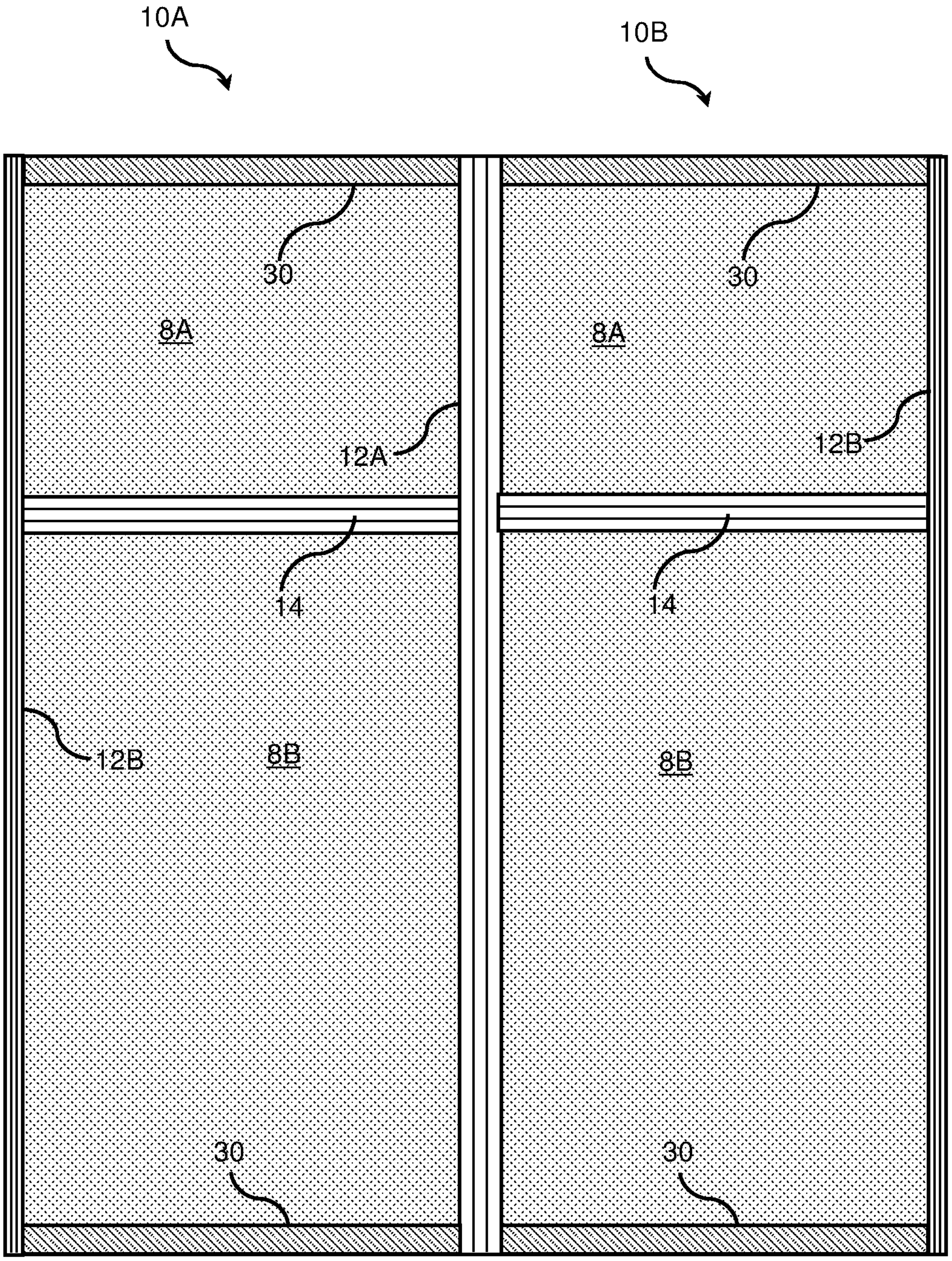
FIG. 3 illustrates a front view of the window system with horizontal fins.
Figure 4:
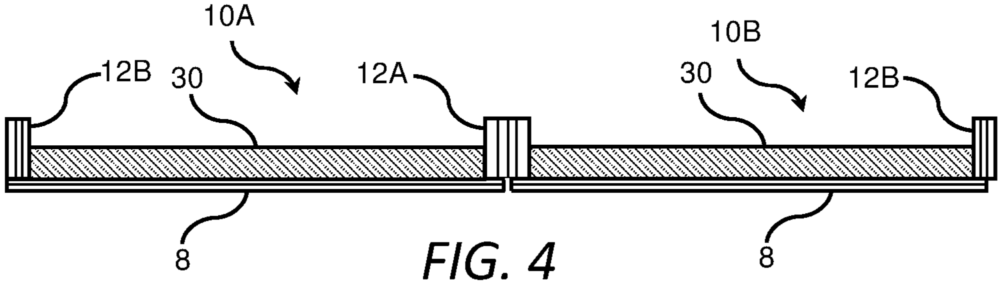
FIG. 4 illustrates a bottom view of the window system with horizontal fins.

Referring to FIGS. 1 and 2, views of a window system are shown with a bracket 30. Similarly, FIGS. 1A and 2A, show views of a window system with a metal support 31 interfaced to the bracket 30. Although various mechanisms and brackets are shown in several of the figures, the window panels 10A/10B with vertical fins 12A/12B are what provide a glass curtain that is relatively simple to install, provides improved visibility, and, because of the strength provided by the vertical fins 12A/12B, provides resistance to wind load. In some embodiments, especially when the size of the window panels 10A/10B are tall, horizontal fins 14 are also provided as shown in FIGS. 3 and 4. Although the fins are described throughout this document as being made of glass, any material is anticipated such as plastic, etc.

Note that in FIGS. 1, 2, 1A, 2A, 3, and 4, two window panels 10A/10B are shown connected to each other. It is fully anticipated to create a glass curtain by attaching as many window panels 10A/10B as needed to fill the space between the header/footer and side joists. Although the window panels 10A/10B are shown mounted side-by-side, stacking is fully anticipated.

Although. In some embodiments, the glass 8 is anticipated to be made of any glass configuration such as solid glass, safety glass, and laminated glass, in one embodiment, the glass is made of an insulated safety glass as shown in FIGS. 5-8.

In all embodiments, vertical fins 12A/12B and optionally a horizontal fin 14 are bonded to an inside surface of the glass 8 to provide structural strength, resisting penetration and bowing during high winds. Each vertical fin 12A/12B and each horizontal fin 14 is made of a number of layers of glass laminated to each other. In the embodiments shown in FIGS. 5-8, the laminated glass of intermediate vertical fins 12A is made from five sheets of 0.5-inch-thick glass that are bonded together (e.g., by a layer of silicone bond) making the laminated glass 2.75 inches thick, while the laminated glass of the end vertical fins 12B is made from three sheets of 0.5-inch-thick glass that are bonded together (e.g., by a layer of silicone bond) making the laminated glass 1.6 inches thick. In some embodiments, the laminated glass of intermediate vertical fins 12A is made from any number of sheets of glass that are bonded together (e.g., by a layer of silicone bond), for example, three sheets of 0.5-inch-thick-thick glass that are bonded together. In some embodiments, the laminated glass of the end vertical fins 12B is made from any number of sheets of glass that are bonded together (e.g., by a layer of silicone bond), for example two sheets of 0.5-inch-thick glass that are bonded together (e.g., by a layer of silicone bond).

Note that there is no requirement that vertical fins 12A/12B and horizontal fins 14 are the same thickness and there is no requirement that both are the same depth. In the examples shown, the horizontal fins 14 and intermediate vertical fins 12A are the same thickness (e.g., 5 layers of 0.5-inch-thick glass) while the end vertical fins 12B are thinner (e.g., 3 layers of 0.5-inch-thick glass). In some embodiments, the horizontal fins 14 are any number of sheets of glass that are bonded together (e.g., by a layer of silicone bond), for example three sheets of 0.5-inch-thick glass that are bonded together. In examples shown, the horizontal fins 14 are not as deep as the vertical fins 12A/12B. For example, when the window panels 10A/10B do not exceed, for example, 8 feet in height, the depth of the vertical fins 12A/12B do not exceed 12 inches. When the window panels 10A/10B are, for example, 20 feet high, the depth of the vertical fins 12A/12B are between 12 inches and 20 inches deep, but in both cases, the depth of the horizontal fins 14 do not exceed 9 inches. These sizes are examples and final sizes are to be determined by an engineer.

Figure 6:
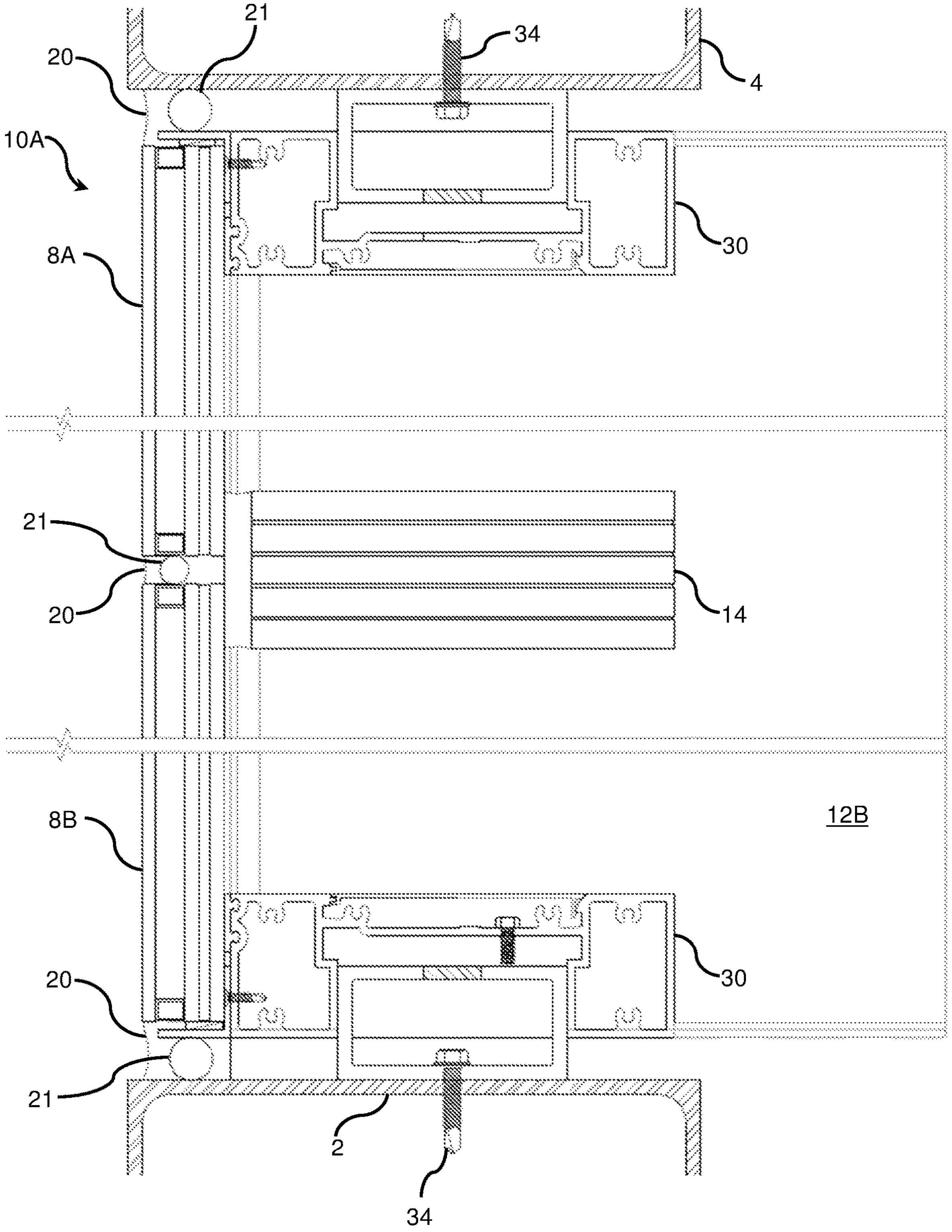
FIG. 6 illustrates a cut-away side view of the window system attached between a header and a footer.
Figure 7:
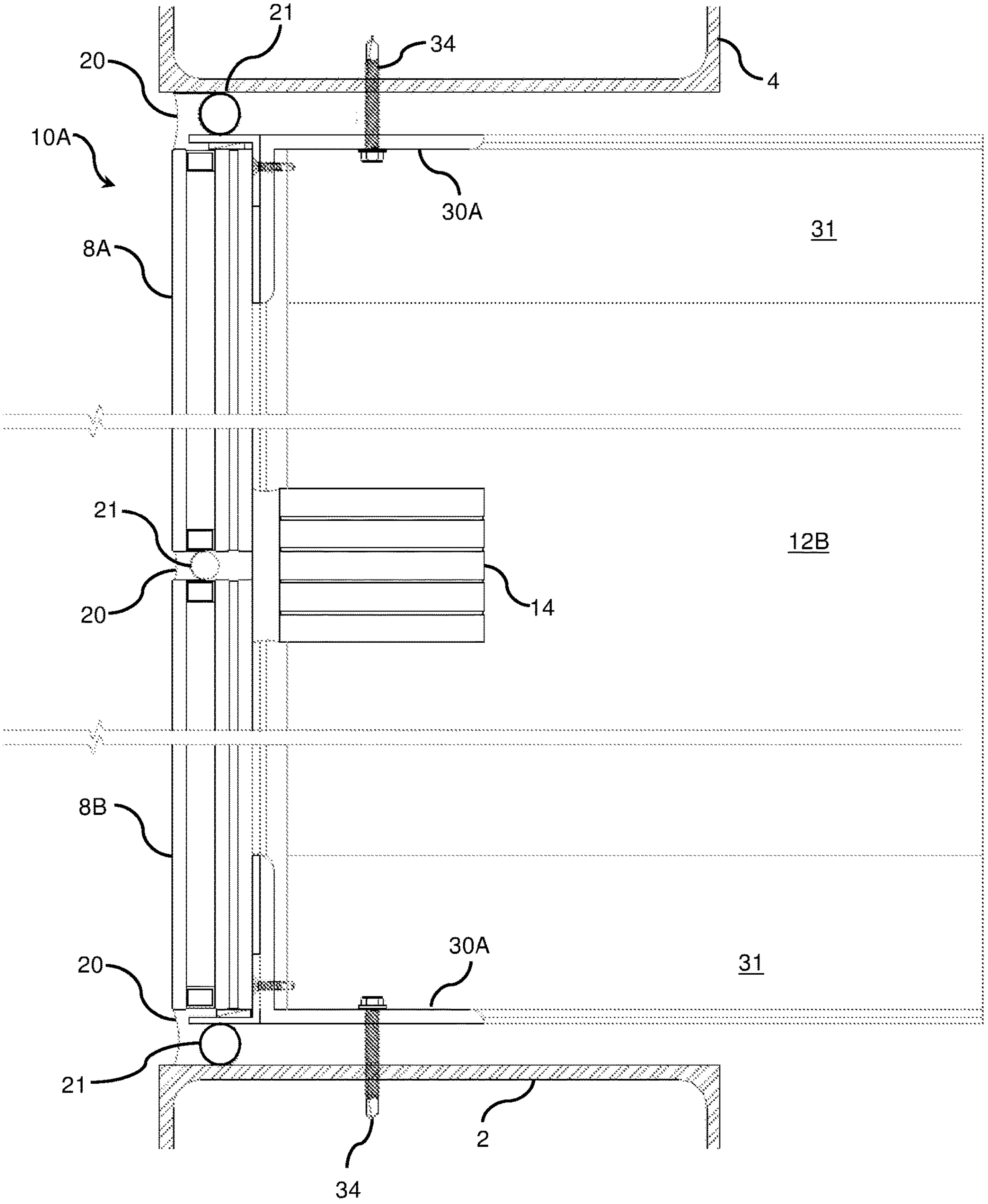
FIG. 7 illustrates a cut-away side view of the window system attached between a header and a footer using an L-bracket.

Each panel has a bracket 30 affixed to the top edge (for attaching to the header 4 see FIGS. 6 and 7) and a bracket 30 affixed to the bottom edge (for attaching to the footer 2 see FIGS. 6 and 7).

Figure 8:
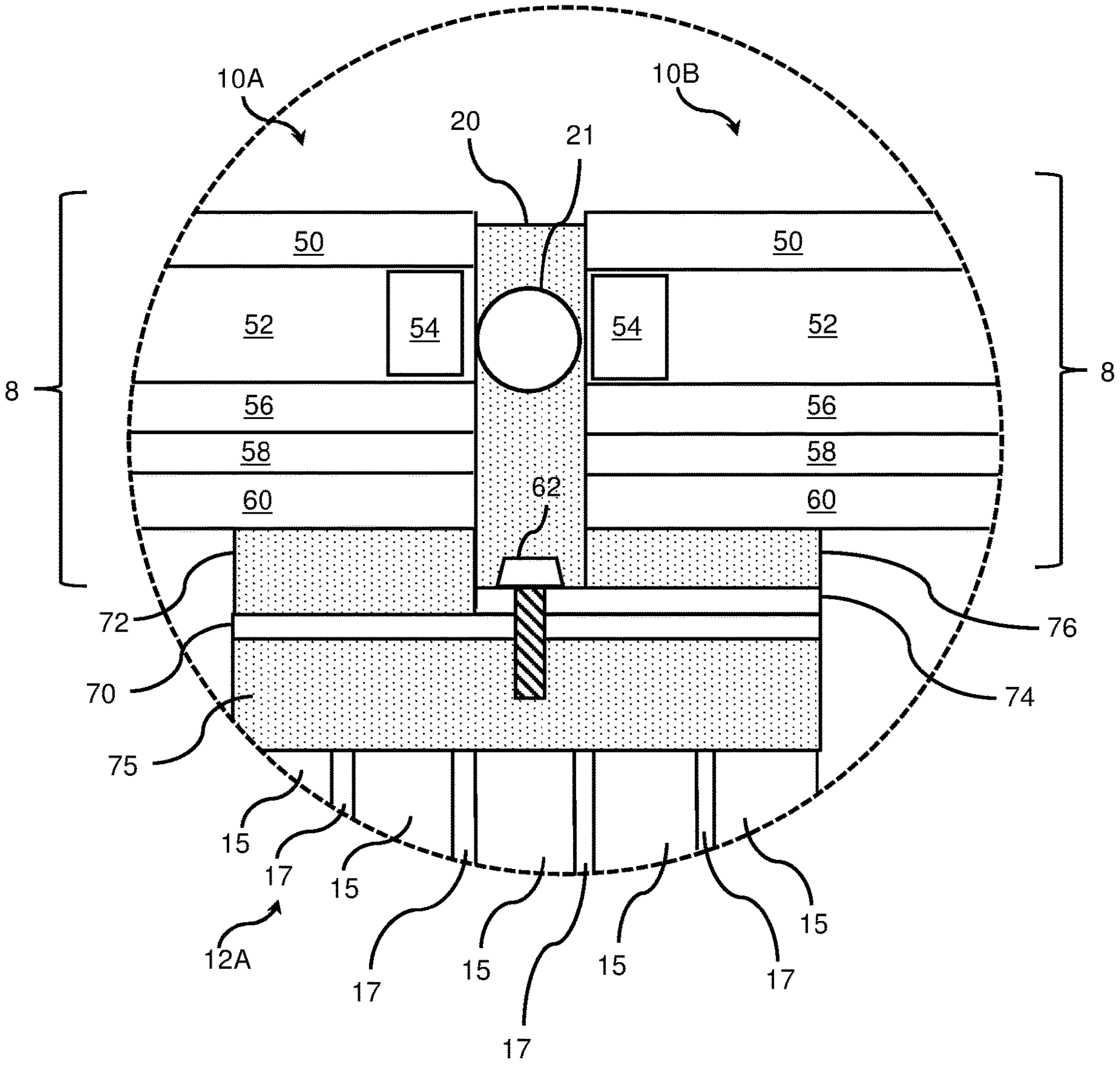
FIGS. 8 and 8A illustrates an expanded detail view including two plates of the window system connected to each other.
Figure 9:
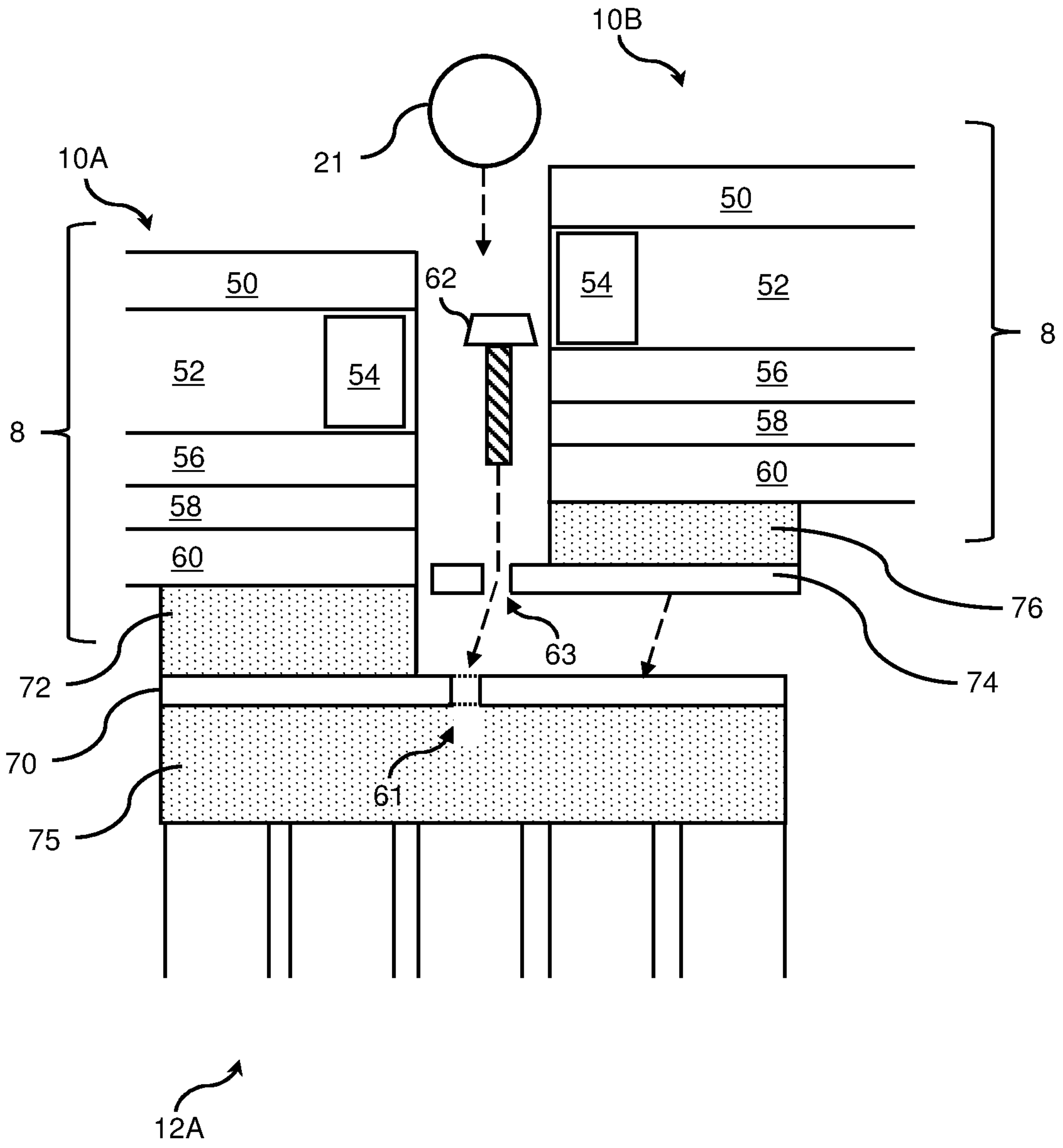
FIGS. 9 and 9A illustrates an expanded detail view including two plates of the window system prior to being connected to each other.

In FIG. 1, two window panels 10A/10B are installed and joined together in the way shown in FIGS. 8 and 9.

In FIG. 2, a plan view of the two window panels 10A/10B is shown from the top. The edge of the glass 8, the edge of the vertical fins, and the top surface of the bracket 30 are visible.

FIGS. 1A and 2A are similar to FIGS. 1 and 2, with the addition of metal supports 31 that are affixed to the vertical fins 12A/12B. In some embodiments, metal supports 31 are affixed to the bottom and/or top edges of the vertical fins 12A/12B to provide added structural rigidity to the vertical fins 12A/12B. The metal supports 31, as shown in FIG. 7 are strips of metal. In some embodiment metal supports 31 match the height of the bracket 30. In such embodiments, the metal supports 31 are affixed to the bottom and/or top edge of the vertical fins 12A/12B with a bonding material such as structural silicone. Note that in some embodiments, the visible surface of the metal supports 31 and/or the bracket 30 are painted or coated with a color. In some embodiments, the metal support 31 is sealed to the glass 8 and is connected to (part of or affixed to) the adjacent bracket 30.

Referring to FIGS. 3 and 4, views of the window system having horizontal fins 14 are shown. In some embodiments, horizontal fins 14 are included, affixed to some or all window panels 10A/10B, especially window panels 10A/10B that exceed 12 feet in height. Note that it is fully anticipated that in designing of a glass curtain for a specific building, some window panels 10A/10B will have only vertical fins 12A/12B, while some window panels 10A/10B will have both vertical fins 12A/12B and horizontal fins 14, in any combination; while in another glass curtain, all window panels 10A/10B will have both vertical fins 12A/12B and horizontal fins 14. In this embodiment, an upper glass 8A is bonded to a lower glass 8B at the horizontal fin 14 (see FIGS. 6 and 7 for details).

In FIG. 4, a plan view of the two window panels 10A/10B is shown from the top. The edge of the glass 8, the edge of the vertical fins, and the top surface of the bracket 30 are visible. The horizontal fin 14 is blocked by the bracket 30.

Note that in some embodiments, the panels 10A/10B shown in FIGS. 3 and 4 will include the metal supports 31 as in FIGS. 1A and 2A.

Note that one specific bracket 30 is shown in FIGS. 1, 2, 1A, 2A, 3, and 4, though it is anticipated that any bracket be used, including the L-bracket 30A as shown in FIG. 7.

Figure 5:
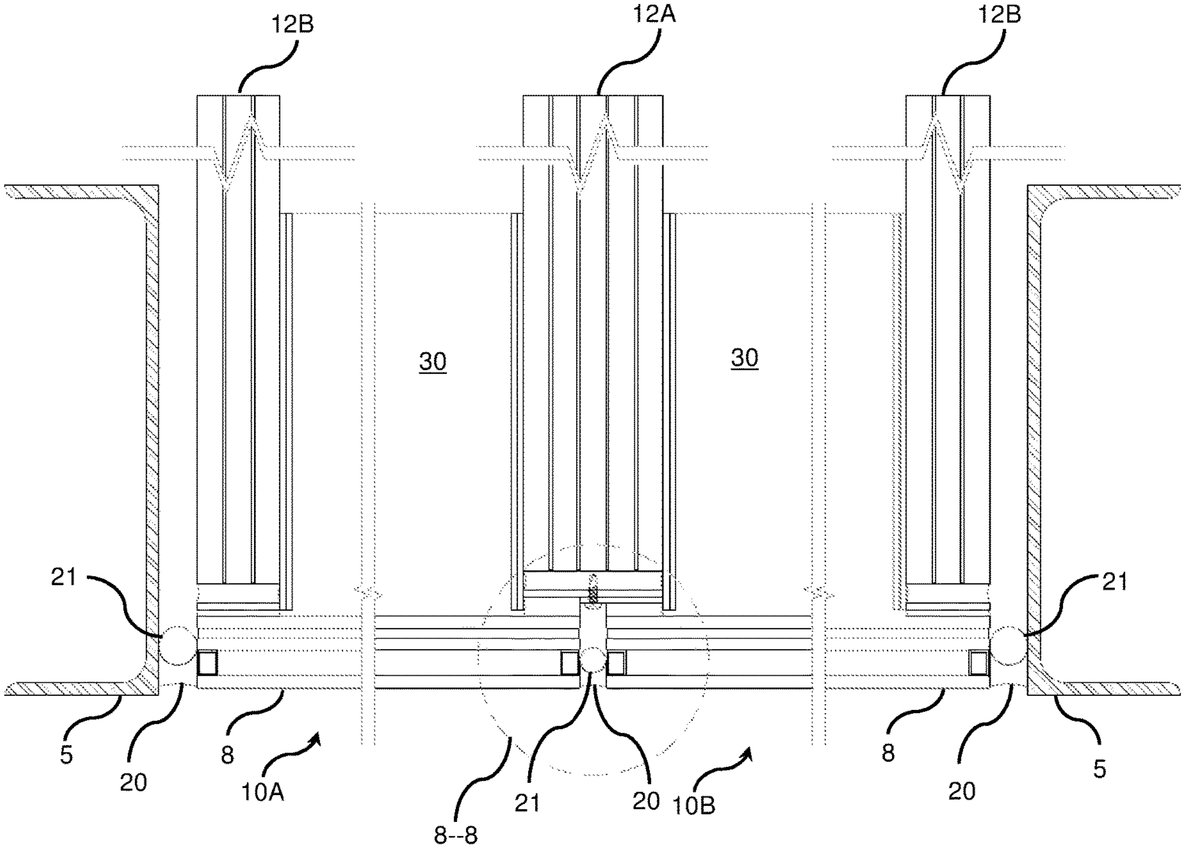
FIG. 5 illustrates a plan view of the window system attached between two jambs.

Referring to FIG. 5, a plan view of the window system attached between two joists 5 is shown.

In general, glass curtains are installed in an opening bound by a header 4 at the top, a footer 2 at the bottom (see FIGS. 6 and 7), and jambs 5 at each side as known in the industry. In FIG. 5, the window panel 10A to the left is sealed to the jamb 5 at the left by a backer rod 21 and sealant 20. The window panel 10B to the right is also sealed to the jamb 5 at the right by a backer rod 21 and sealant 20.

In FIG. 5, the glass 8 is shown as insulated safety glass as will be discussed in FIGS. 8 and 9. Note also, in this example, there is no horizontal fin 14 shown and the bracket 30 at the bottom is shown.

Referring to FIG. 6, a cut away side view of the window system attached to a header 4 and footer 2 is shown viewed from the jamb-side (e.g., the jamb 5 of the foreground is removed and the jamb 5 in the background is hidden from view by the end vertical fin 12B.

Note that in embodiments in which the window panel 10A is greater than, say, 12 feet in height, it becomes necessary to use two sheets of glass 8 (e.g., insulated glass) as many glass manufactures are not capable of making, for example, 5-foot-wide insulated glass that is greater than 12 feet high. Therefore, to achieve a window panel 10 that is 20 feet high, a top glass 8A (e.g., 8 feet high) and a bottom glass 8B (e.g., 12 feet high) are used as shown. In such, the top sheet of glass 8A is joined and bonded to the bottom sheet of glass 8B at the horizontal fin 14 as shown in FIGS. 6 and 7.

Note that it is equally anticipated to use a single sheet of glass 8, especially for window panels 10 that are 12 feet high or less. In such, there is no gap with a sealant 20 and no backer rod 21 since the glass 8 is continuous.

Figure 10:
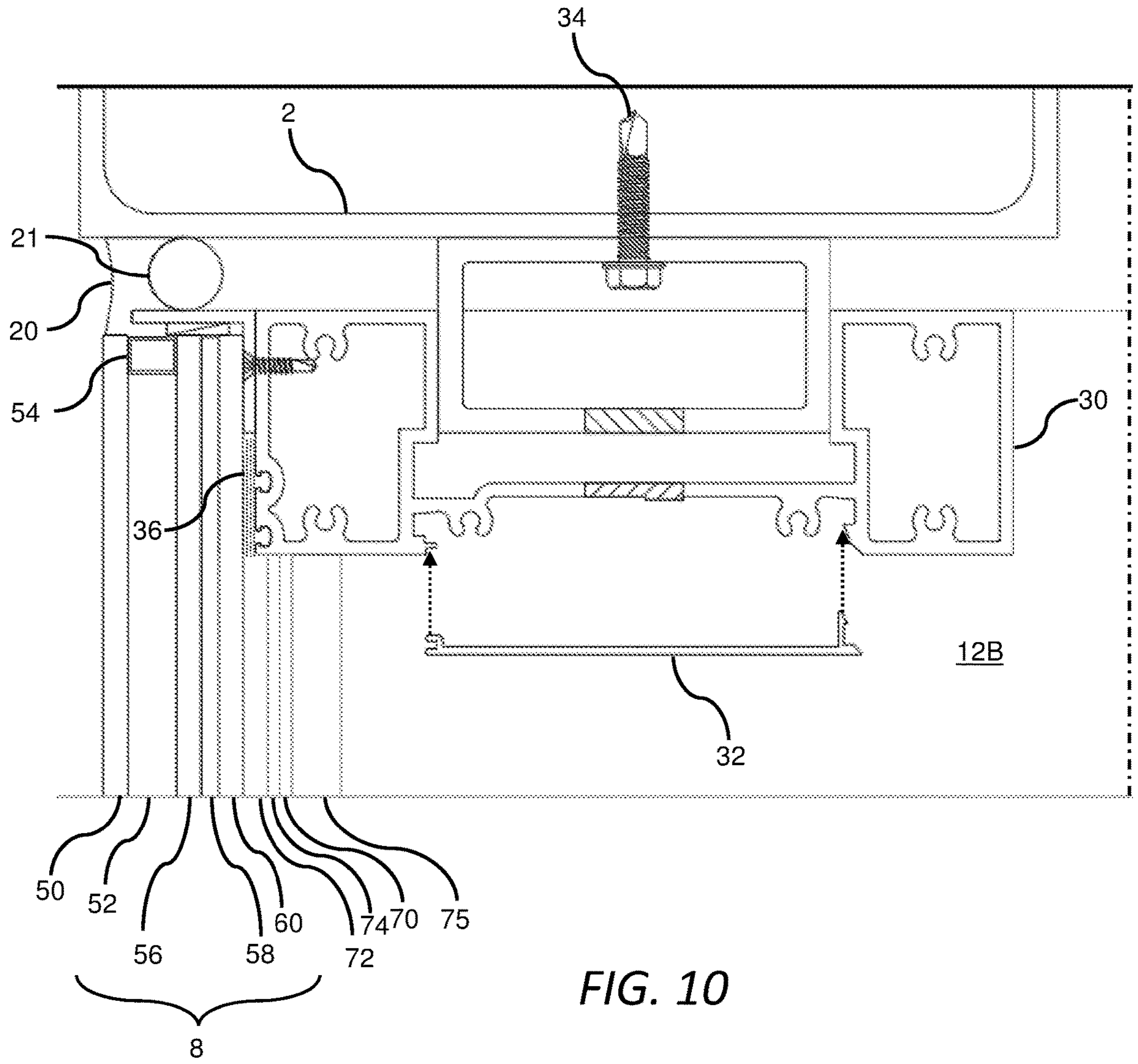
FIG. 10 illustrates a schematic view of the window system connected to the footer with a bracket.

In FIG. 6, the window panel 10A is attached to the footer 2 using a bracket 30 (details of this bracket 30 are shown in FIG. 10). The bracket 30 is bonded to the inner surface at a lower edge of the glass 8 (e.g., by structural silicone) during manufacture of the window panel 10A. During installation, the bracket 30 is screwed into the footer 2 by fasteners 34 (e.g., screws). Likewise, the window panel 10A is attached to the header 4 using a bracket 30. This bracket 30 is bonded to the inner surface of the upper edge of the glass 8 (e.g., by structural silicone) during manufacture of the window panel 10A. During installation, the bracket 30 is screwed into the header 4 by fasteners 34 (e.g., screws).

Referring to FIG. 7, a cut-away side view of the window system attached to a header 4 and footer 2 is again shown viewed from the jamb-side (e.g., the jamb 5 of the foreground is removed and the jamb 5 in the background is hidden from view by the end vertical fin 12B.

As above, in embodiments in which the window panel 10A is greater than, say, 12 feet in height, it becomes necessary to use two sheets of glass 8 (e.g., insulated glass) as many glass manufactures are not capable of making, for example, 5-foot-wide insulated glass that is greater than 12 feet high. Therefore, to achieve a window panel 10A that is 20 feet high, a top glass 8A (e.g., 8 feet high) and a bottom glass 8B (e.g., 12 feet high) are used as shown. In such, the top sheet of glass 8A is joined and bonded to the bottom sheet of glass 8B at the horizontal fin 14 as shown in FIGS. 6 and 7.

Note that it is equally anticipated to use a single sheet of glass 8, especially for window panels 10A that are 12 feet high or less.

In FIG. 7, the window panel 10A is attached to the footer 2 using an L-bracket 30A instead of the bracket 30 shown in FIG. 6. The L-bracket 30A is bonded to the inner surface at a lower edge of the glass 8B (e.g., by structural silicone) during manufacture of the window panel 10A. During installation, the L-bracket 30A is screwed into the footer 2 by fasteners 34 (e.g., screws). Likewise, the window panel 10A is attached to the header 4 using an L-bracket 30A. This L-bracket 30A is bonded to the inner surface of the upper edge of the glass 8A (e.g., by structural silicone) during manufacture of the window panel 10A. During installation, the L-bracket 30A is screwed into the header 4 by fasteners 34 (e.g., screws).

Note that other brackets are equally anticipated and there is no limitation that the same bracket be used against the header 4 as is used against the footer 2.

In FIGS. 5-7, the glass 8 is shown as insulated safety glass as will be discussed in FIGS. 8 AND 9. Again, it is fully anticipated that in some embodiments, the glass 8 is a non-insulated safety glass (e.g., if thermal protection is not required) or a non-safety glass (e.g., if impact protection is not required). Note also, in FIGS. 5-7, the horizontal fins 14 are not as wide as the vertical fins 12A/12B.

In FIG. 7, an optional metal support 31 is shown affixed to the bottom edge of the bottom glass 8B and an optional metal support 31 is shown affixed to the top edge of the top glass 8A.

Figure 8A:
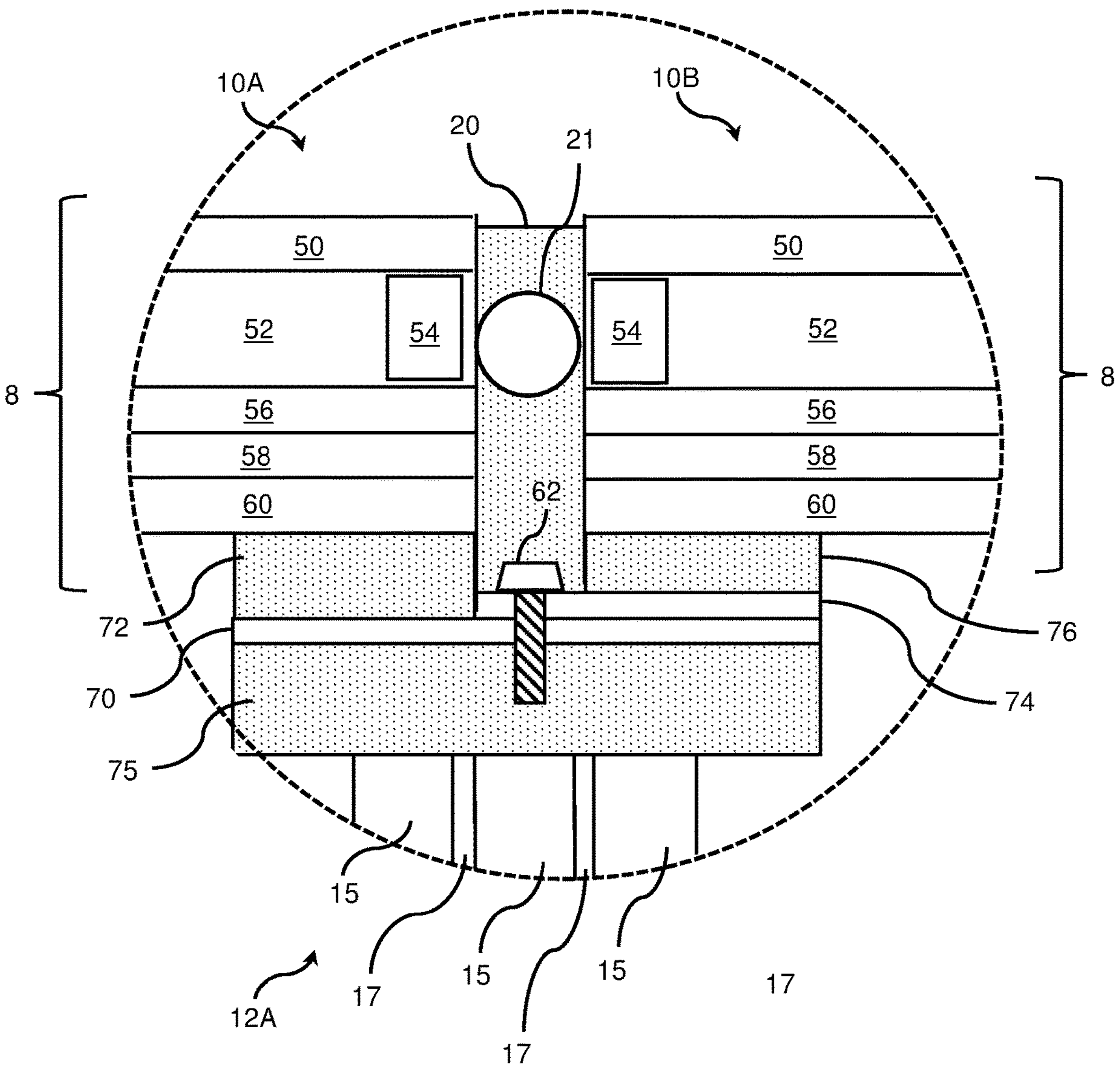

Referring to FIGS. 8 and 8A, expanded views of the interface between two window panels 10 of the window system is shown. This is a top view as in FIG. 5, ignoring the header 2. In FIG. 8, the intermediate vertical fin 12A includes five sheets of glass (e.g., 0.5" thick solid glass) laminated to adjacent sheets of glass (e.g., by a layer of silicone bond) while in FIG. 8A, the intermediate vertical fin 12A includes three sheets of glass (e.g., 0.5" thick solid glass) laminated to adjacent sheets of glass (e.g., by a layer of silicone bond). As noted above, any number of sheets of glass is anticipated.

In this view, the composition of the glass 8 of one embodiment is revealed. As discussed before, there is no restriction regarding the type of glass 8, including solid glass, laminated glass, safety glass, and insulated glass. The glass 8 shown as an example in FIG. 8 is an insulated safety glass that provides thermal insulation as well as safety from glass shattering when impacted by an object such as might be hurled at the glass 8 during high winds. This exemplary glass included an outer glass layer 50, a gas layer 52 sealed by end seals 54 and a laminated glass layer (safety glass) made of an outer glass 56, interlayer 58, and an inner glass 60 (inner being closest to living spaces). In this exemplary glass 8, when a projectile strikes the outer glass layer 50, it is anticipated that the outer glass layer 50 will break. It is also anticipated that the projectile will continue to travel and strike the inner glass layer, but due to the interlayer 58, the projectile will be stopped and penetration of the window panel 10 will be prevented.

Connecting of adjacent window panels 10A/10B is accomplished by an overlap at the intermediate vertical fins 12A. In the embodiment of FIG. 8, the intermediate vertical fin 12A is made of five sheets of glass 15 (or three sheets of glass 15 in FIG. 8A) that are laminated together by four laminations 17 (or two laminations 17 as in FIG. 8A) producing a solid sheet of laminated glass having, for example, a thickness of, for example, 2.75 inches. An end surface of this laminated glass (intermediate vertical fin 12A) is affixed to a fin support 70 (e.g., a sheet of metal approximately the width and length of an end of the intermediate vertical fin 12A) by a fin adhesive layer 75 made of an adhesive such as structural silicone during manufacture of the window panel 10A. This manufacturing process securely bonds the end of the fin (in this example, the intermediate vertical fin 12A) to the fin support 70. Note that in other embodiments, the vertical fins 12A are made of any numbers of sheets of glass 15 of any thickness.

Likewise, a portion of the fin support 70 is adhered to an inner surface of the glass 8 by a fin adhesive layer 72 made of an adhesive such as structural silicone during manufacture of the window panel 10A. Therefore, the fin (e.g., the intermediate vertical fin 12A) is securely affixed to the fin support 70 and the fin support 70 is securely affixed to an inner surface of an edge of the glass 8, shown on the left side of FIG. 8.

Also, during manufacture, a glass support 74 (e.g., a sheet of metal that is less than the width and approximately the length of an end of an intermediate vertical fin 12A) is affixed to an inside edge of the glass 8, i.e., window panel 10B on the right side of FIG. 8 (an inside edge that is distal from the edge that has a fin) by an adhesive layer 76. Note that the glass support 74 extends beyond an edge of the glass 8, located on the right side of FIG. 8 and beyond the adhesive layer 76 to provide for holes 63 (see FIG. 9) through which fastening devices 62 (e.g., a screw) are inserted during installation to affix the glass support 74 to the fin support 70 by passing through the holes 63 and into receiving holes 61 (see FIG. 9) in the fin support 70. Note that although the fastening device 62 is shown as a screw, any type of fastening is anticipated.

As FIG. 8 is a cross-sectional view, only one fastener 62 is shown joining the left window panel 10A to the right window panel 10B, though there are several fasteners 62 spaced along the interface to securely connect the two window panels 10A/10B.

After installation of the fastening devices 62, the gap between the glass 8 of one of the left window panel 10A and the glass 8 of the right window panels 10B is filled, for example, with a silicone material. In some embodiments, a backer rod 21 is place in the gap.

Figure 9A:
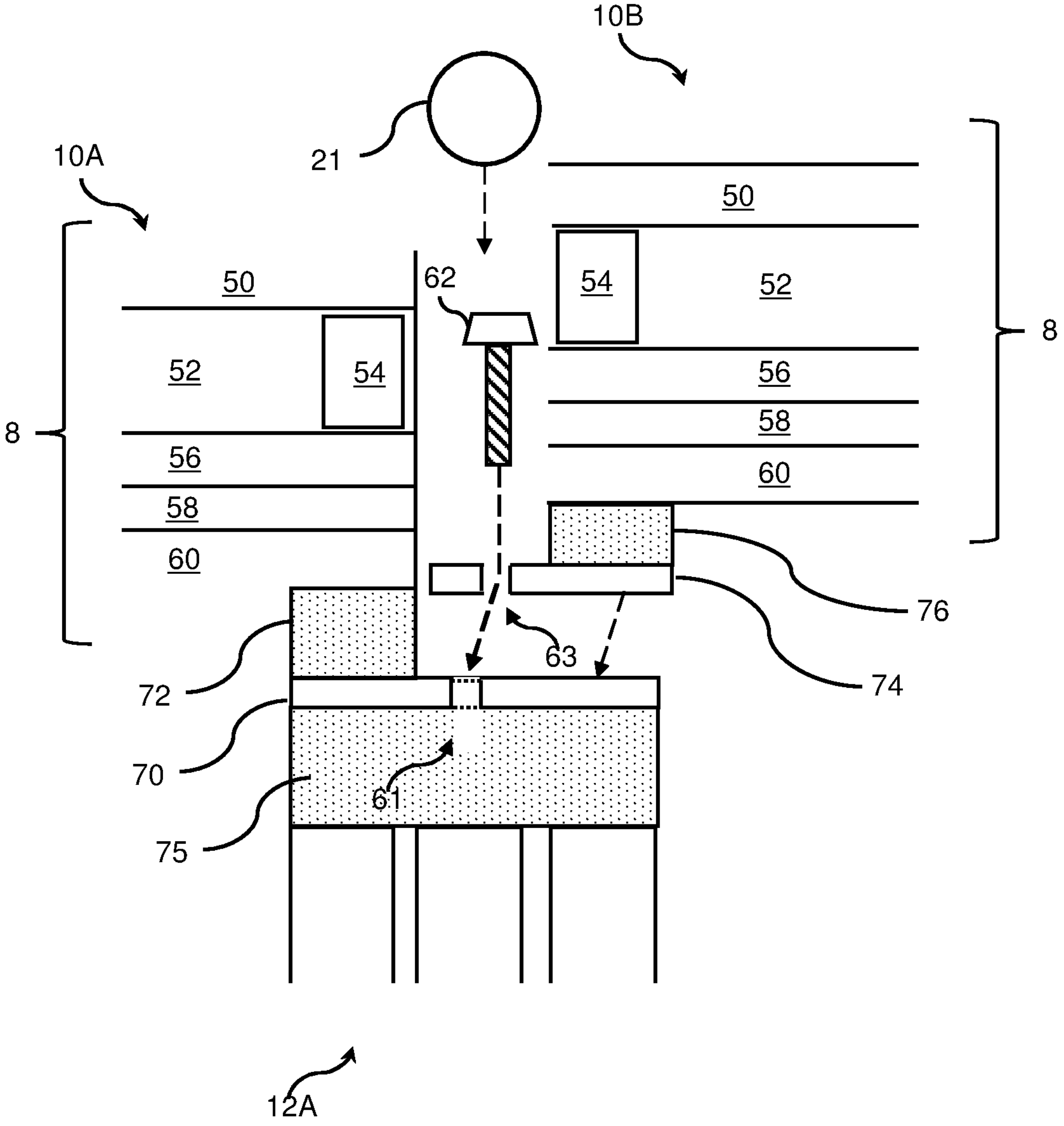

Referring to FIG. 9, an expanded view two window panels 10A/10B of the window system are shown prior to being connected to each other. In FIG. 9, the intermediate vertical fin 12A includes five sheets of glass (e.g., 0.5" thick solid glass) laminated to adjacent sheets of glass (e.g., by a layer of silicone bond) while in FIG. 9A, the intermediate vertical fin 12A includes three sheets of glass (e.g., 0.5" thick solid glass) laminated to adjacent sheets of glass (e.g., by a layer of silicone bond). As noted above, any number of sheets of glass is anticipated.

As in FIG, 8, the composition of the glass 8 is revealed. As discussed before, there is no restriction regarding the type of glass 8, including solid glass, laminated glass, safety glass, and insulated glass. The glass 8 shown as an example in FIG. 8 is an insulated safety glass that provides thermal insulation as well as safety from glass shattering when impacted by an object such as might be hurled at the glass 8 during high winds. This exemplary glass included an outer glass layer 50, a gas layer 52 sealed by an end seal 54 and an inner laminated glass layer (safety glass) made of an outer glass 56, interlayer 58, and an inner glass 60 (inner being closest to living spaces).

Connecting of adjacent window panels 10A/10B is accomplished by an overlap at the intermediate vertical fins 12A. In FIG. 9, the intermediate vertical fin 12A is shown bonded to the window panel 10A at the left. In such, the fin support 70 is bonded to an edge surface of the intermediate vertical fin 12A and a length of the fin support 70 is bonded to the inside surface of an edge of the inner laminated glass 60. The fin support 70 of the window panel 10A at the left has a receiving hole 61 for accepting a fastening device 62.

Therefore, the intermediate vertical fin 12A is securely affixed to the fin support 70 and the fin support 70 is securely affixed to an edge of the glass 8 on the left side of FIG. 9.

The edge of the window panel 10B at the right has a glass support 74 (e.g., a sheet of metal that is less than the width and approximately the length of an end of an intermediate vertical fin 12A) is affixed to the inside surface of an edge of the inner laminated glass 60 of the window pane to the right by an adhesive layer 76. The glass support 74 extends beyond the edge of the glass 8 and beyond the adhesive layer 76 and has holes 63 through which a fastening device 62 (e.g., a screw) is inserted during installation.

During installation, two window panels 10A/10B are placed such that the holes 61/63 align and the fastening device (e.g., screw) is inserted through the hole 63 and engages with the receiving holes 61.

Note that although the fastening device 62 is shown as a screw, any type of fastening device 62 is anticipated.

After installation of the fastening devices 62, in some embodiments, a backer rod 21 is place in the gap.

After installation of the fastening device 62 and optionally, the backer rod 21, the gap between the glass 8 of the left window panel 10A and the glass 8 of the right window panel 10B is sealed, for example, with a silicone material.

Referring to FIG. 10, a schematic view of the window system connected to the footer 2 with a bracket 30 is shown. Note that as similar connection is made for the header 4. The bracket 30 is affixed to an inside surface of the glass 8 by an adhesive 36 and during installation to the footer 2, fasteners 34 (e.g., a screws) hold the bracket 30 to the footer 2. After the fastener 34 is installed, a decorative cover 32 is applied to the bracket 30 for aesthetic reasons.

After the bracket 30 is affixed to the footer 2, in some embodiments, a backer rod 21 is inserted between the glass 8 and the footer 2 and a sealant 20 is used to fill the gap between the bracket 30 and the footer 2.

In some installations, the bracket 30 is also affixed to an adjacent vertical fin 12A/12B by an adhesive.

Figure 11:
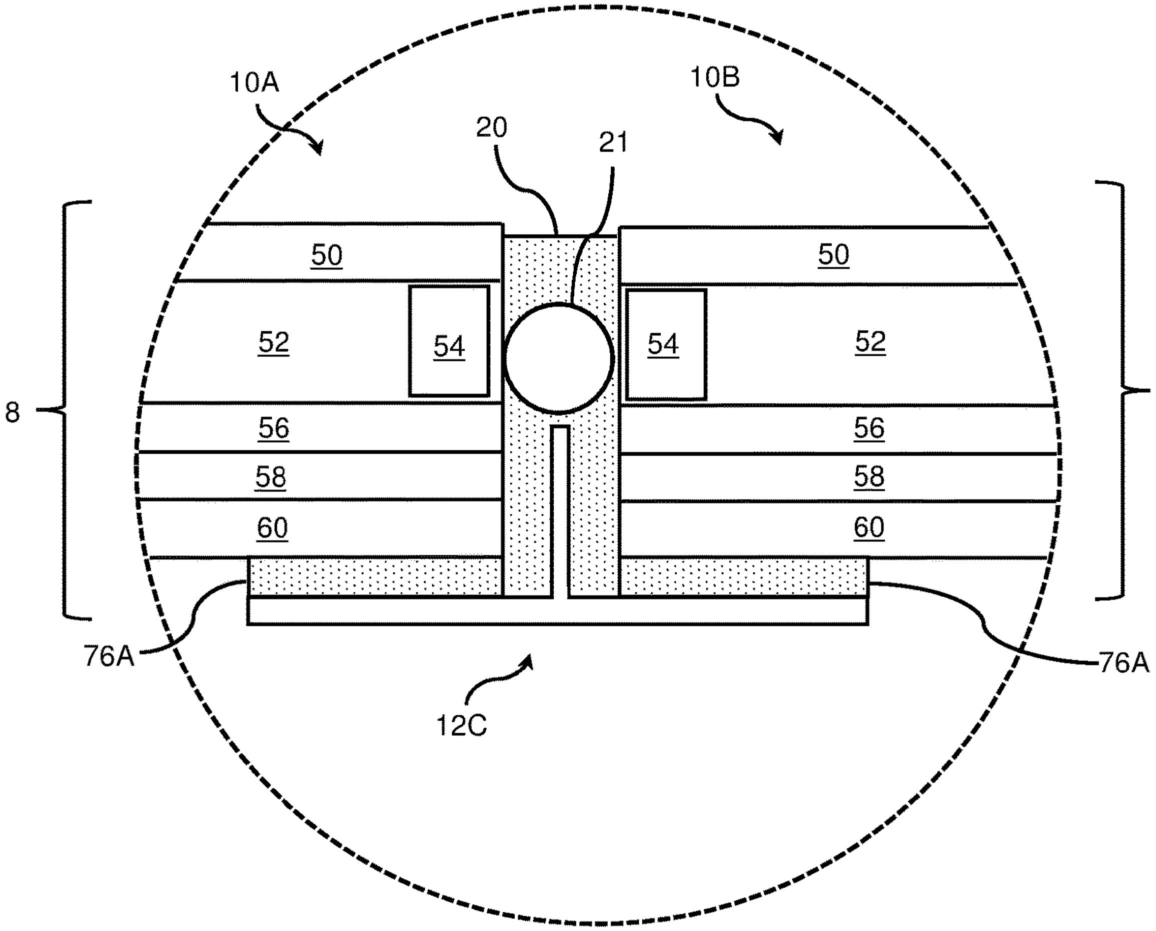
FIG. 11 illustrates an expanded view of an alternate interface between two window panels 10 of the window system.

Referring to FIG. 11, an expanded view of an alternate interface between two window panels 10 of the window system is shown. This is a top view as in FIG. 5, ignoring the header 2. In FIG. 11, instead of having the intermediate vertical fin 12A, a metal plate 12C (e.g., a T-shaped metal plate) is bonded to the glass 8 by an adhesive layer 76A (e.g., by a layer of silicone bond).

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A window panel, the window panel comprising:

a rectangular sheet that comprises glass, the rectangular sheet having a front planar surface, a back planar surface, two horizontal sides, and two vertical sides; and a vertical fin affixed to the back planar surface of the rectangular sheet at a vertical edge of the rectangular sheet, the vertical fin made from sheets of the glass laminated together;

wherein the vertical fin comprises at least two sheets of the glass, each sheet of the at least two sheets of the glass laminated to a next sheet of the at least two sheets of the glass.

2. The window panel of claim 1, wherein the rectangular sheet comprises insulated safety glass.

3. The window panel of claim 2, wherein the insulated safety glass comprises at least two inner sheets of the glass laminated to each other, a gas-filed insulation layer, and an outer sheet of the glass that is affixed to the at least two inner sheets of the glass at edges by an end seal.

4. The window panel of claim 1, wherein the vertical fin is affixed to the back planar surface of the rectangular sheet with an adhesive.

5. The window panel of claim 1, wherein the vertical fin comprises at three sheets of the glass, each sheet of the three sheets of the glass having a thickness of 0.5 inches and each sheet of the three sheets of the glass laminated to a next sheet of the three sheets of the glass.

6. The window panel of claim 1, further comprising a horizontal fin affixed to the back planar surface of the rectangular sheet at a horizontal edge of the rectangular sheet, the horizontal fin made from the sheets of the glass laminated together.

7. The window panel of claim 1, further comprising a horizontal plate bonded to the back planar surface of the rectangular sheet at a horizontal edge of the rectangular sheet by an adhesive, the horizontal plate made from a sheet of metal.

8. A glass curtain comprising:

a plurality of window panels, each window panel having a rectangular sheet that comprises glass, the rectangular sheet having a front planar surface, a back planar surface, two horizontal sides, and two vertical sides and a vertical fin affixed to the back planar surface of the rectangular sheet at a vertical edge of the rectangular sheet, the vertical fin made from sheets of the glass laminated together; and whereas a first vertical side of a first window panel of the plurality of window panels is affixed to an opposite vertical side of an adjacent window panel of the plurality of window panels by the vertical fin of the first window panel.

9. The glass curtain of claim 8, whereas a first horizontal side of the first window panel of the plurality of window panels is affixed to an opposite horizontal side of a third window panel of the plurality of window panels by a horizontal fin of the first window panel, the horizontal fin affixed to the back planar surface of the rectangular sheet at a horizontal edge of the rectangular sheet, the horizontal fin made from the sheets of the glass laminated together.

10. The glass curtain of claim 8, whereas a first horizontal side of the first window panel of the plurality of window panels is affixed to an opposite horizontal side of a third window panel of the plurality of window panels by a horizontal plate of the first window panel, the horizontal plate is affixed to the back planar surface of the rectangular sheet at a horizontal edge of the rectangular sheet, the horizontal plate made from a sheet of metal.

11. The glass curtain of claim 8, wherein rectangular sheet comprises insulated safety glass.

12. The glass curtain of claim 11, wherein the insulated safety glass comprises at least two inner sheets of the glass laminated to each other, a gas-filed insulation layer, and an outer sheet of the glass that is affixed to the at least two inner sheets of the glass at edges by an end seal.

13. The glass curtain of claim 8, wherein the vertical fin is affixed to the back planar surface of the rectangular sheet with an adhesive.

14. The glass curtain of claim 8, wherein the vertical fin comprises at least two sheets of the glass, each sheet of the at least two sheets of the glass laminated to a next sheet of the at least two sheets of the glass.

15. The glass curtain of claim 8, wherein the vertical fin comprises at three sheets of the glass, each sheet of the three sheets of the glass having a thickness of 0.5 inches and each sheet of the three sheets of the glass laminated to a next sheet of the three sheets of the glass.

16. A glass curtain comprising:

a plurality of window panels, each window panel having a rectangular sheet that comprises glass, the rectangular sheet having a front planar surface, a back planar surface, two horizontal sides, and two vertical sides, a vertical fin affixed to the back planar surface of the rectangular sheet at a vertical edge of the rectangular sheet, and a horizontal fin affixed to the back planar surface of the rectangular sheet at one of the horizontal edges, the horizontal fin and the vertical fin comprise sheets of the glass laminated together;

whereas a first vertical side of a first window panel of the plurality of window panels is affixed to an opposite vertical side of an adjacent window panel of the plurality of window panels by the vertical fin of the first window panel; and the first window panel of the plurality of window panels is affixed to an opposite horizontal side of a third window panel of the plurality of window panels by the horizontal fin of the first window panel, the horizontal fin affixed to the back planar surface of the third window panel at a horizontal edge of the rectangular sheet of the third window panel.

17. The glass curtain of claim 16, wherein the vertical fin comprises at least two sheets of the glass, each sheet of the at least two sheets of the glass laminated to a next sheet of the at least two sheets of the glass.

18. The glass curtain of claim 16, wherein the vertical fin comprises at three sheets of the glass, each sheet of the three sheets of the glass having a thickness of 0.5 inches and each sheet of the three sheets of the glass laminated to a next sheet of the three sheets of the glass.

19. The glass curtain of claim 16, wherein the horizontal fin comprises at least two sheets of the glass, each sheet of the at least two sheets of the glass laminated to a next sheet of the at least two sheets of the glass.

* * * * *